UNITED STATES PATENT OFFICE 2,287,071

ORGANIC AMINE DERIVATIVES AND METHOD OF OBTAINING SAME

Edward W. Tillitson, Detroit, Mich., assignor to Parke, Davis & Company, Detroit, Mich., a corporation of Michigan No Drawing. Application August 8, 1938, Serial No. 223,763

15 Claims. (Cl. 260—211)

The invention relates to a new class of products obtained by the interaction of organic amines, hydroxy aldehydes and bisulfite salts.

I have found that a great variety of primary and secondary organic amines is capable of reacting with a bisulfite salt and a hydroxy aldehyde, or with the equivalent reaction product of a bisulfite salt and a hydroxy aldehyde, to give new and useful products. The new products have, in greater or less degree, the valuable property of being more soluble in aqueous solutions than the original amine free base used in the reaction.

The type formula which may be used for representing the products of the invention is,

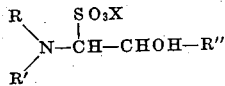

where R is a substituted or unsubstituted hydrocarbon radical, R' is a member of the class hydrogen and a substituted or unsubstituted hydrocarbon radical, X is an alkali metal, and R'' is a member of the group hydrogen, lower alkyl and hydroxy alkyl radicals.

Apparently, the hydroxy aldehyde bisulfite amine derivatives of the invention are comparatively easily decomposed in aqueous solution to give the original amine and can therefore be used instead of the amine and in many instances has an application where the free unreacted amine is unsuitable. The new compounds are especially valuable because of their increased solubility.

Among the new compounds I have found a preferred group in which R' of the above formula is hydrogen, R is a phenyl radical substituted by a sulfone group of the formula,

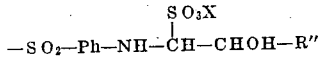

where Ph represents a phenyl group, and X and R'' have the same significance as given for the first formula above.

The compounds of this preferred sub-group therefore have the general formula,

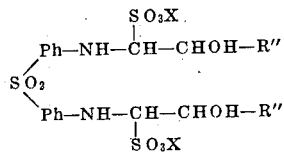

where Ph is a phenyl nucleus, X is an alkali metal and R'' is a member of the group hydrogen, lower alkyl and hydroxy alkyl.

These latter compounds are preferred because many of them are very effective antiseptics and germicides. They can be prepared for therapeutic administration in much higher concentrations than is possible with the corresponding amine free base. For example, diamino diphenyl sulfone when condensed with sodium bisulfite and an aldose or sugar, such as dextrose, gives a product which has the enormously increased solubility in aqueous solution of about 3,000 times that of the diamino diphenyl sulfone free base itself. This increase in solubility is obtained without any loss in antiseptic power when chemically equivalent quantities of the hydroxy aldehyde bisulfite condensate are compared with the free amine itself.

When the hydroxy aldehyde which reacts with the alkali bisulfite and the amine is an aldose, it may be a mono-saccharose or a di-saccharose and may contain two or more carbon atoms in the sugar part of the molecule.

The compounds of the aldo-sugar bisulfite type are particularly useful because the sugar and the bisulfite parts of the molecule are non-toxic and readily eliminated by the body and this enhances their therapeutic value.

In obtaining the compounds of the invention, the amine free base, the hydroxy aldehyde, and the bisulfite salt may be brought together for reaction in any order. Preferably, however, the bisulfite and the hydroxy aldehyde or sugar are first reacted and this reaction product is then further reacted or condensed with the amine free base.

Examples of compounds which come within the scope of the invention are the dextrose sodium sulfonate derivatives of p-amino phenoxyethanol, m-phenylene diamine, o-amino phenol, p-amino phenol, p-amino ethylbenzoate, 3-amino-4-(β-hydroxy ethoxy) phenyl arsenoxide, 3-amino-4-(β-hydroxy-n-propoxy) phenyl arsenoxide, p-amino acetanilide, p-toluidine, p-ethylaniline, aniline, p-amino acetophenone, benzidine, p-amino dimethylaniline, 3-amino-4-hydroxy phenyl arsenoxide, 4-amino phenyl arsenoxide, 4,4'-diamino arsenobenzene, 3,3'-diamino-4,4'-dihydroxy arsenobenzene, 3,3'-diamino-4,4'-di(β-hydroxy ethoxy) arsenobenzene, neutral acriflavine, m-nitro aniline, o-toluidine, o-chloro aniline, p-bromo aniline, sulfanilamide (p-amino benzenesulfonamide), disulfanilamide (p'-amino benzenesulfonyl-p-amino benzenesulfonamide), diamino diphenyl sulfone, diamino diphenyl sulfoxide, diamino diphenyl sulfide, diamino diphenyl disulfide, diamino diphenyl disulfoxide, p-amino p'-nitro diphenyl sulfoxide, procaine (p-amino diethyl amino ethylbenzoate), 2-naphthylamine-6-sulfonic acid, 1-amino-2-naphthol-4-sulfonic acid, p-amino phenoxy-acetone, 2-amino-4-nitrophenol, p-nitro aniline, (2,4-dinitro aniline), 5-amino-8-hydroxy quinoline, di-n-butylamine, di-isopropylamine, 1-ephedrine base, pseudo-ephedrine base, 2-amino-n-octane, etc.

It is preferred, although it is not necessary, that the hydroxyl group of the hydroxy aldehyde used should be on a carbon atom adjacent to the aldehyde carbon atom. That is, an alpha hydroxy aldehyde reagent is preferred. Various hydroxy aldehydes, in addition to the usual aldo sugars, can be used to form the bisulfite derivatives. For example, one may use glyceraldehyde, α-hydroxy propionaldehyde, α-hydroxy butyraldehyde, α-hydroxy-α-phenyl acetaldehyde, glycollic aldehyde, various aldo-trioses, aldo-tetroses, aldo-pentoses, aldo-hexoses, aldo-heptoses, aldo-octoses, aldo-nonoses, etc.

The sulfur in the condensation products is probably present as in a sulfonic acid group,

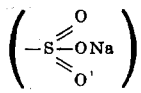

the sulfur having a valence of six instead of four. Hence, it seems proper to call the new compounds hydroxy aldehyde alkali metal sulfonate derivatives.

In the case of the diamino diphenyl sulfone derivatives the sugar bisulfite condensates have been found to have a solubility on the order of several hundred or several thousand times that of the corresponding diamino diphenyl sulfone free bases. This increase in solubility is obtained without simultaneous decrease in the therapeutic activity of the diamino diphenyl sulfone free base. Other condensation products of the invention have also been found to have a very greatly increased solubility over the free base and without loss of antiseptic activity. This property of increasing the solubility of the free base makes it possible to administer relatively high concentrations of internal antiseptic in very small volumes of solution, thus providing more convenient and better tolerated therapeutic preparations.

In reacting the amine free base with the hydroxy aldehyde and the bisulfite salt it may be desirable in some cases to use an excess of the aldehyde and bisulfite since I have found that the presence of an excess of the latter two substances frequently results in concentrated aqueous solutions of the condensate being more stable than when equimolecular proportions are reacted. For instance, a mole of sulfanilamide can be reacted with about 1.2 moles of sodium bisulfite and about 1.4 moles of dextrose or even higher proportions to give a product which is more stable, especially in aqueous solutions of high concentration, than the product obtained by using exact equimolecular quantities of reagents.

I do not wish to limit the invention by any theory as to the reactions which occur during formation of the new products. However, it appears that the condensation takes place somewhat as follows:

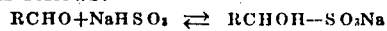
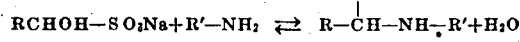

where RCHO represents the hydroxyaldehyde and R′—NH₂ represents the organic amine. On the basis of these reactions, there would be a possibility of decomposition of the final condensate in aqueous solutions and the presence of an excess of bisulfite salt or hydroxy aldehyde, or both, would in some cases tend to prevent the amine aldehyde bisulfite condensate from decomposing with precipitation of the less soluble amine free base.

The condensation can be carried out not only in aqueous solution but also, when the amine is sufficiently thermostable, by fusing the reactants together in the dry state. The fact that the condensates generally have far greater solubility than the amine free bases from which they are derived, shows that definite compounds are formed, probably in accordance with the equations given above.

When obtaining the products of the invention by fusion of the reagents in the dry state, it is preferred that the hydroxy aldehyde be brought to the liquid state, by heating if necessary, and the alkali bisulfite first added and then the amine free base. Vigorous stirring may be required and in the case of some aldehydes, such as sugars, careful temperature control may also be advisable in order to obtain a pure white product.

The following examples will serve to illustrate the invention:

EXAMPLE 1.—*Sulfanilamide dextrose sodium sulfonate (reaction in solution)*

375 grams of dextrose and 145 grams of sodium bisulfite are heated to boiling in 500 cc. of water. 198 grams of sulfanilamide are added and the boiling continued in the open air until the volume is reduced to 600 cc. This gives a clear, viscous and almost colorless solution containing the equivalent of 0.33 gram of sulfanilamide per cc. This solution may be diluted to any desired concentration without formation of a precipitate. It can be evaporated down to dryness to give a dry solid which is also readily soluble in water. Approximately 30 or 40 times as much of the dry product can be brought into solution as is possible with sulfanilamide itself. Furthermore, the sulfanilamide dextrose sodium sulfonate product of this example has the same order of antiseptic power as an equivalent amount of sulfanilamide itself.

EXAMPLE 2.—*Sulfanilamide dextrose sodium sulfonate (reaction by fusion)*

472 grams of dextrose are fused at a temperature not substantially in excess of 155° C. and 181 grams of sodium bisulfite rapidly stirred into the fused dextrose. By stirring the reactants, a uniform pasty mass free from lumps is obtained. 250 grams of sulfanilamide are rapidly stirred into this pasty mass, after which the hot material is spread out in a thin layer and cooled in vacuo. Moisture resulting from the condensation reaction is removed during the cooling in vacuo. The dry solid product is a porous mass and may be pulverized if desired. The reaction product is the same as that obtained in Example 1 and has the same properties.

EXAMPLE 3.—*Sulfanilamide d-galactose sodium sulfonate*

24.3 grams of d-galactose and 12.5 grams of sodium bisulfite are dissolved in about 50 cc. of hot water. About 17.2 grams of sulfanilamide are added and the heating continued for about 30 minutes. The reaction product may be diluted further with water or may be brought to dryness as described for the product of Example 1 above.

EXAMPLE 4.—*Sulfanilamide maltose sodium sulfonate*

27 grams of maltose and 6.2 grams of sodium bisulfite are heated in about 50 cc. of water. 8.6 grams of sulfanilamide are then added and the heating continued until solution is complete. The solution of the sulfanilamide maltose sodium sulfonate thus obtained is rather concentrated and it may be either brought to dryness to give the solid product or may be diluted further with water or other solvent.

EXAMPLE 5.—*Sulfanilamide lactose sodium sulfonate*

36 grams of lactose, 10.5 grams of sodium bisulfite and 17 grams of sulfanilamide are added to about 300 cc. of water and heated until the reaction is complete and all of the product is in solution. The final solution of the condensate resembles that of the preceding examples and upon evaporating the solvent the dry solid product is obtained. It has about the same appearance as the dry product of the preceding examples.

EXAMPLE 6.—*Sulfanilamide glyceraldehyde sodium sulfonate*

92 grams of glyceraldehyde, 104 grams of sodium bisulfite and 170 grams of sulfanilamide are heated in 250 cc. of water until solution is complete. The resulting solution of the reaction product can be obtained in dry form by evaporation of the solvent.

EXAMPLE 7.—*p'-Aminobenzene sulfonyl p-amino benzene sulfonamide dextrose sodium sulfonate*

Three grams of disulfanilamide (p'-aminobenzene sulfonyl p-amino benzene sulfonamide), 2 grams of dextrose and 1.1 grams of sodium bisulfite are boiled in 20 cc. of water until solution is complete. The water is then evaporated off, thereby giving the solid condensation product which readily dissolves in concentrations far greater than is possible with the amine free base used as a starting material.

EXAMPLE 8.—*Diamino diphenyl sulfone di-dextrose sodium sulfonate (reaction in solution)*

Ten grams of p,p'-diamino diphenyl sulfone, 30 grams of dextrose and 10 grams of sodium bisulfite are heated with 50 cc. of water almost to complete solution. At this point a small amount of insoluble material is filtered off the reaction mixture, the filtrate diluted with water to 200 cc. and filtered while hot. The filtrate is a stable solution of diamino diphenyl sulfone dextrose sodium sulfonate. It may be used directly for therapeutic administration, especially as an internal antiseptic. The solvent can be removed or evaporated from this product to give the dry white amorphous solid diamino diphenyl sulfone dextrose sodium sulfonate, probably having the formula,

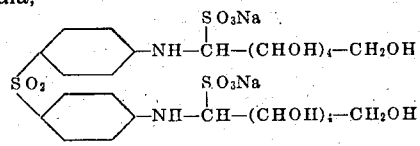

EXAMPLE 9.—*Diamino diphenyl sulfone di-dextrose sodium sulfonate (reaction by fusion)*

540 grams of dextrose are fused at a temperature not to exceed about 150° C. and 190 grams of sodium bisulfite rapidly stirred into the fused dextrose. When the fusion mixture becomes uniform 248 grams of p,p'-diamino diphenyl sulfone are stirred in. A pasty product is thereby obtained and after cooling and removing moisture, if necessary in vacuo, an amorphous solid diamino diphenyl sulfone dextrose sodium sulfonate product is obtained which can be readily pulverized to a white amorphous powder. The solid product is readily soluble in water to give a clear colorless solution. The solid product of this example when dissolved in water gives solutions of the same condensate as described in Example 8.

The diamino diphenyl sulfone dextrose sodium sulfonate product of this example and of Example 8 is two or three thousand times as soluble in water as the original p,p'-diamino diphenyl sulfone free base. Thus, the free base is soluble to the extent of about one one-hundredth of 1% in water, whereas the condensate with dextrose and sodium bisulfite can be made up in solutions as strong as 25% or 35% strength. This is a distinct advantage when preparing therapeutic solutions, for example for injection purposes, where it is desirable that the therapeutically active substance be injected in a solution having as small a volume as possible.

EXAMPLE 10.—*Diamino diphenyl sulfoxide di-dextrose sodium sulfonate*

4.6 grams of p,p'-diamino diphenyl sulfoxide, 14.5 grams of dextrose and 5 grams of sodium bisulfite are heated to boiling in 50 cc. of water until a completely clear solution is obtained. The product is a solution of diamino diphenyl sulfoxide di-dextrose sodium sulfonate.

The corresponding diamino diphenyl sulfoxide mono-dextrose sodium sulfonate compound is obtained by carrying out this example with the use of about one-half the proportions of dextrose and sodium bisulfite. The mono-compound is several hundred times as soluble as the diamino diphenyl sulfoxide free base, but is less soluble than the diamino diphenyl sulfoxide di-dextrose sodium sulfonate compound. The formulas for the mono- and the di-compounds of this example are,

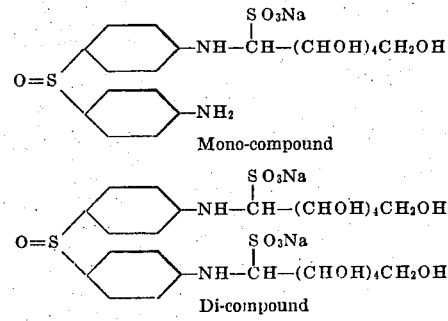

EXAMPLE 11.—*Amino nitro diphenyl sulfoxide dextrose sodium sulfonate*

One gram of p-amino-p'-nitro diphenyl sulfoxide, 3 grams of dextrose and 2 grams of sodium bisulfite are heated in 50 cc. of boiling water. Complete solution is obtained in a few minutes. The solution contains p-amino-p'-nitro diphenyl sulfoxide dextrose sodium sulfonate, which may be obtained in solid form by evaporation of the solvent.

EXAMPLE 12.—*3,3'-diamino-4,4'-dihydroxy arsenobenzene-N,N'-di-dextrose sodium sulfonate*

25 grams of 3-amino-4-hydroxy phenyl arsonic acid are reduced to the arseno compound by the usual means. The neutral wet paste of the arseno compound is reacted with 25 grams of dextrose and 12 grams of sodium bisulfite in hot aqueous solution under a carbon dioxide atmosphere to give a light yellow stable solution of the arsenical suitable for injection administration.

EXAMPLE 13.—*3,3'-diamino-4,4'-di-(β-hydroxyethoxy) arsenobenzene-N,N'-di-dextrose sodium sulfonate*

25 grams of 3-amino-4-β-hydroxy ethoxy phenyl arsonic acid hydrate is reduced to the corresponding arseno compound with excess hypophosphorous acid. The neutralized wet pasty arseno compound is heated in an inert atmosphere at 80° with 22 grams of dextrose and 10.6 grams of sodium bisulfite, dissolved in 100 cc. of water and 10 cc. ethylene glycol until the solution is clear. The final volume is about 160 cc. The product is a light yellow stable solution suitable for injection purposes containing the arsenical in much higher concentration than can be obtained with the diamino free base alone.

EXAMPLE 14.—*3-amino-4-hydroxy phenyl arsenoxide dextrose sodium sulfonate*

Ten grams of 3-amino-4-hydroxy phenyl arsenoxide, 13 grams of dextrose and 6.8 grams of sodium bisulfite are heated with 75 cc. of water until solution is complete. The solution is filtered and then cooled in a carbon dioxide atmosphere. The ampouled solution is clear, stable and suitable for injection purposes.

The solution can be brought to dryness in a vacuum and the solid 3-amino-4-hydroxy phenyl arsenoxide dextrose sodium sulfonate obtained. It has the formula,

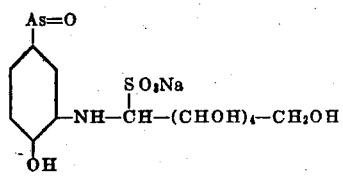

The above examples are given merely to illustrate the invention and are not intended to limit it to the specific substances or conditions therein disclosed.

What I claim as my invention is:

1. Method for obtaining a derivative of an organic amine which comprises heating to a temperature not substantially above 155° C. to effect a reaction between an aldo-sugar, an alkali metal bisulfite and an organic amine having a replaceable amino hydrogen atom.

2. Method for obtaining a derivative of an amino-substituted diphenyl sulfone, an amino group of which has a replaceable hydrogen atom which comprises heating to a temperature not substantially above 155° C. to effect a reaction between an aldo-sugar, an alkali metal bisulfite and said amino-substituted diphenyl sulfone under conditions which cause said compounds to condense together with elimination of water and production of a water-soluble product.

3. Method for obtaining a derivative of an amino-substituted diphenyl sulfone, an amino group of which has a replaceable hydrogen atom which comprises heating to a temperature not substantially above 155° C. to effect a reaction between dextrose, an alkali metal bisulfite and said amino-substituted diphenyl sulfone under conditions which cause said compounds to condense together with elimination of water and production of a water-soluble product.

4. Method for obtaining a derivative of diamino diphenyl sulfone which comprises heating to a temperature not substantially above 155° C. to effect a reaction between dextrose, an alkali metal bisulfite and said diamino diphenyl sulfone under conditions which cause said compounds to condense together with elimination of water and production of a water-soluble product.

5. Method for obtaining diamino diphenyl sulfone dextrose sodium sulfonate which comprises heating to a temperature not substantially above 155° C. to effect a reaction between dextrose, sodium bisulfite and diamino diphenyl sulfone under conditions which cause said compounds to condense together with elimination of water and production of a water-soluble product.

6. Method for obtaining a p,p'-diamino diphenyl sulfone dextrose sodium sulfonate which comprises fusing dextrose at a temperature not substantially above 155° C. with sodium bisulfite and thereafter reacting the hot fusion product with p,p'-diamino diphenyl sulfone under conditions which cause said compounds to condense together with elimination of water and production of a water-soluble product.

7. Organic amine derivatives having the formula

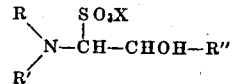

where R is a hydrocarbon radical, R' is a member of the class hydrogen and a hydrocarbon radical, X is an alkali metal and R" is a member of the group hydrogen, lower alkyl and hydroxy alkyl radicals.

8. Organic amine derivatives of the formula,

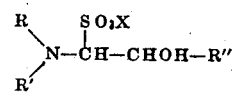

where R is a hydrocarbon radical, R' is a member of the class hydrogen and a hydrocarbon radical, X is an alkali metal and R" is a hydroxy alkyl radical.

9. p,p'-Diamino diphenyl sulfone dextrose sodium sulfonate.

10. Method for obtaining a derivative of an organic amine which comprises heating to a temperature not substantially above 155° C. to effect a reaction between an aliphatic α-hydroxy aldehyde, an alkali metal bisulfite and a primary aryl amine under conditions which cause said compounds to condense together with elimination of water and production of a water-soluble product.

11. Method for obtaining a derivative of an organic amine which comprises heating to a temperature not substantially above 155° C. to effect a reaction between an aliphatic α-hydroxy aldehyde, an alkali metal bisulfite and an organic amine having a replaceable hydrogen atom under conditions which cause said compounds to condense together with elimination of water and production of a water-soluble product.

12. Method for obtaining a derivative of an amino-substituted diphenyl sulfone, an amino group of which has a replaceable hydrogen atom, which comprises heating to a temperature not substantially above 155° C. to effect a reaction between an aliphatic α-hydroxy aldehyde, an alkali metal bisulfite and the amino-substituted diphenyl sulfone under conditions which cause said compounds to condense together with elimination of water and production of a water-soluble product.

13. p,p'-Diamino diphenyl sulfoxide di-dextrose sodium sulfonate.

14. A diamino diphenyl sulfoxide dextrose sodium sulfonate.

15. A compound having the following formula:

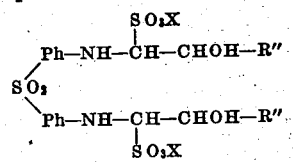

wherein Ph is a phenyl nucleus, X is an alkali metal and R'' is a member of the group hydrogen, lower alkyl and hydroxy alkyl.

EDWARD W. TILLITSON.